Dec. 21, 1943.   R. F. THOMPSON ET AL   2,337,137
APPARATUS FOR THE TREATMENT OF SOLID MATERIAL WITH LIQUID
Filed April 24, 1941
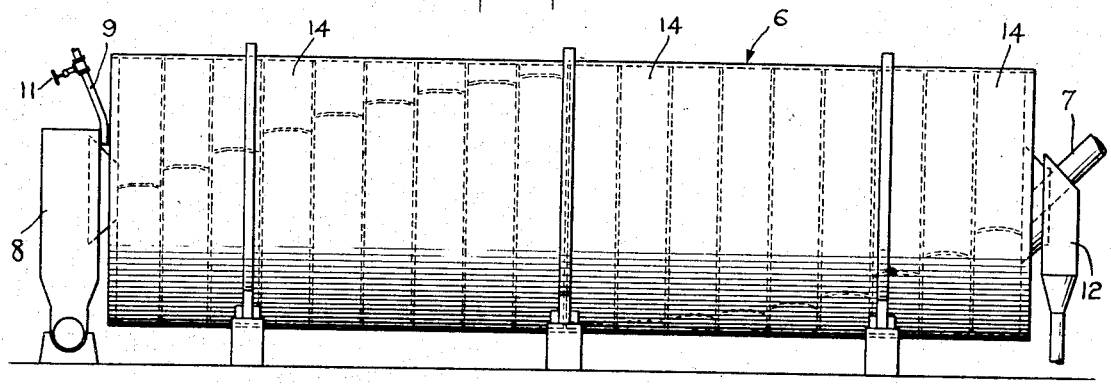
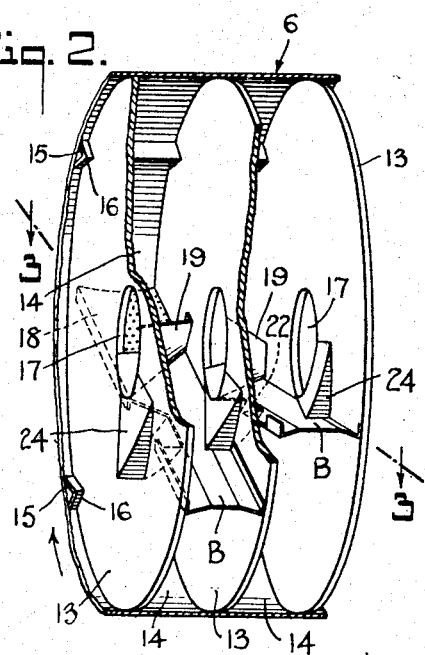
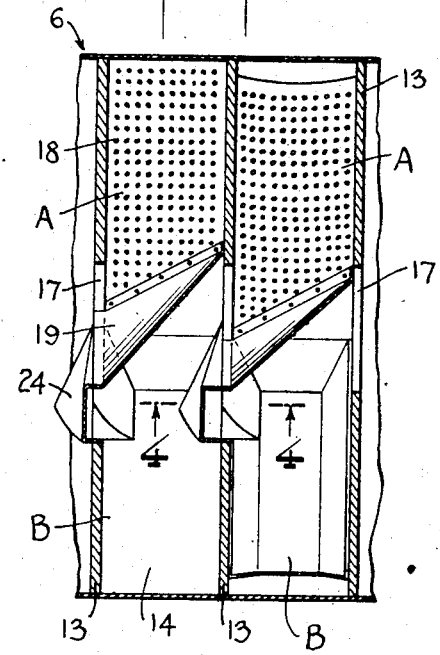
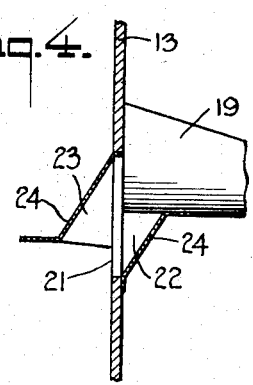
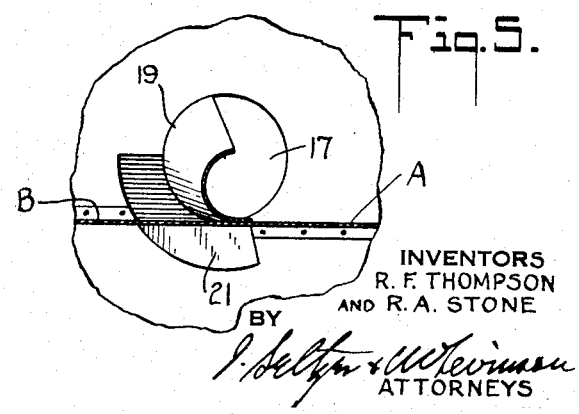
INVENTORS
R. F. THOMPSON
AND R. A. STONE
BY
ATTORNEYS Patented Dec. 21, 1943

2,337,137

UNITED STATES PATENT OFFICE 2,337,137

APPARATUS FOR THE TREATMENT OF SOLID MATERIALS WITH LIQUIDS

Robert F. Thompson and Royal A. Stone, Cumberland, Md., assignors to Celanese Corporation of America, a corporation of Delaware Application April 24, 1941, Serial No. 390,118

13 Claims. (Cl. 23—269)

This invention relates to apparatus for bringing substances in the solid phase into contact with substances in the liquid phase, and relates more particularly to apparatus for washing, leaching or extracting a fibrous or granular solid by countercurrent action with a suitable liquid medium.

An object of this invention is the provision of an improved apparatus for continuously bringing substances in the solid phase into contact with substances in the liquid phase.

A further object of this invention is to provide an apparatus for continuously washing cellulose acetate, which has been precipitated in particle form from a solution thereof in acetic acid, in such a manner that the cellulose acetate is washed substantially free of acetic acid and the wash liquor is of relatively high acid concentration.

Other objects of this invention, together with certain details of construction and combinations of parts, will appear from the following detailed description and the appended claims.

In many manufactures the problem arises of treating solid particles with liquid media in which the bulk of the solid is insoluble with a view, for example, to removing constituents from solid material whether by physical action, as in washing or extraction, or by chemical action of the liquid, or with the view to removing constituents from the liquid by the action of the solid for the purpose of purifying the liquid, recovering therefrom the substances removed, or impregnating the solid. In the treatment of solids with liquids or liquids with solids, it is obviously advantageous to insure as intimate a contact as possible therebetween. The present invention provides a means whereby this desideratum may be obtained in a continuous manner by causing the treating liquid to pass through the solid particles while the solid particles and the treating liquid are passing each other in opposite directions.

In accordance with this invention the solid particles are continuously fed into, propelled along, and discharged from, a rotating cylindrical vessel while the liquid is continuously introduced into said vessel and caused to flow through the body of the solid particles as the latter move in a direction opposite to that of the liquid, the construction and arrangement of the apparatus being such that the liquid remains in contact with the solid particles for an appreciable length of time. By this means the liquid is brought into intimate contact with the solid particles and the treatment is much more effective than if only the liquid flowed, for example, over the surface of the material instead of through it. The apparatus may be used with particular advantage for the treatment of materials with liquids of substantially the same or not very different specific gravities. Moreover, the apparatus may be employed for the treatment of fibrous solids, granular solids, or in fact any solid in a state of division which may be separated on a filter and which will flow from a chute.

The apparatus according to the present invention comprises a rotating cylindrical vessel containing a number of plates or partitions dividing said vessel into a plurality of compartments. The partitions are provided with openings and the compartments are provided with suitable means for passing the solid material from one compartment to another and so on through the cylindrical vessel. The apparatus is also provided with means for feeding the material thereto at one end of the same and means for discharging the material at the other end of the same, together with means for introducing a countercurrent of liquid at the discharge end of said cylindrical vessel. The rotation of the cylindrical vessel causes the means in the compartments to function to pass the solid material from one compartment to another and also to pass the liquid from one compartment to another but in the opposite direction.

We have found that convenient means for passing the material from one compartment to another are sheets which are fastened between the partitions so that they are tangent to the openings in the partition and which are of such size as to divide the compartment into two parts. A semi-cone or scoop shaped deflector co-operates with one end of the sheet to deflect the material into the opening in order to pass it on to the next succeeding compartment and additional openings are arranged near the center openings to permit the liquid to pass from one compartment to another.

One form of apparatus according to this invention is illustrated in the accompanying drawing, in which Figure 1 is a side elevational view of the apparatus showing a cylindrical vessel partitioned off into sections, Figure 2 is a detail view of the interior of the cylindrical vessel showing the openings in the partition walls and the means by which the solid particles are passed from section to section through the vessel and the treating liquid is passed through the sections in counter direction to the solid particles, Figure 3 is a cross-sectional view taken along line 3—3 in Figure 2, Figure 4 is a cross-sectional view, taken along line 4—4 in Figure 3, showing a detail of the construction about the openings in the partitions, and Figure 5 is a front view of the structure shown in Figure 4.

Like reference numerals indicate like parts throughout the several views of the drawing.

Referring to the drawing, the device of this invention is shown as comprising a cylindrical vessel generally indicated by the reference numeral 6 arranged to rotate horizontally upon its axis by any suitable means (not shown). The vessel 6 is provided at one end with a conduit 7 by which the solid material is fed into said vessel, the solid material being discharged at the opposite end of the vessel into a suitable chute 8 from which it is passed into a suitable container, as is well understod in the art. At the material discharge end of the vessel there is provided a pipe 9 having a valve 11 for feeding the liquid into the vessel, either continuously or intermittently as required, the liquid being discharged into a suitable receptacle 12 at the material feed entrance of the vessel. To the inner surface of vessel 6 are fastened with a solid connection circular plates or partitions 13 which are spaced along the interior of the vessel and are arranged to divide the vessel into a number of compartments or cells 14. The partitions may be retained in position by means of right-angled bars 15 suitably fixed to the inner surface of the vessel and co-operating with grooves 16 arranged along the periphery of the partitions 13. While the drawing shows a vessel containing eighteen cells, it is to be understood that our invention is not limited to the use of a vessel containing any specific number of cells. It will be appreciated that the number of cells and the size of the vessel will depend upon the use to which it is intended to be put and/or the nature of the material being treated.

All of the partitions are provided with round center openings 17. Fastened rigidly to the partitions 13 defining each cell 14 and tangent to the center openings 17 are displacement sheets 18 which divide each cell into two parts of unequal size. These displacement sheets having a perforated portion and a solid portion. Furthermore, the displacement sheets may be straight or curved and the perforated portion may be set at an angle to the solid portion. Since these displacement sheets are tangent to the center openings of the partition, they are off the center line of the cylinder by the radius of the center opening. These displacement sheets are so arranged that, when viewed from the material discharge end of the vessel and assuming clockwise rotation, they are arranged in an even spiral and off-set an equal angle, of about 20 degrees, from each other clockwise from the feed end to the discharge end of the vessel. It is to be understood, however, that the displacement sheets may be arranged in a double spiral and in this case the displacement sheets will be off-set from each other on an angle of about 40 degrees. However, this angle may be increased to a greater number of degrees under special conditions of size and design to meet special requirements. A semi-cone or scoop shaped deflector 19 is rigidly mounted in each cell in such a manner that its base meets half of the circular center opening, the apex of the deflector being modified to a flat section and being fastened to the far partition of that cell at a line more than the diameter of the center opening through and away from the cylindrical vessel axis and normal to the displacement sheet 18. The junction of this deflector and the displacement sheet may be a solid connection or the deflector may be removably fastened in the compartment by means of bolts or cap screws. The construction and arrangement of the deflector 19 is such that it divides the displacement sheet into two unequal parts, the part in front of the concave face of the deflector being the shorter part. This part, indicated by the reference character A, is perforated and, as stated, may be either flat or curved. The other or longer part, indicated by reference character B, may be, as stated, off-set from the short part of the displacement sheet.

In order to provide for the passage of the liquid through the vessel in a direction counter to the direction of the flow of the solid material therethrough the inner partitions 13 are provided with an opening 21 radial from the axis of the cylindrical vessel and adjacent to the center opening 17, and also angular openings 22 and 23 in adjacent displacement sheets 18. The openings 21, 22 and 23 are provided with shields 24 which cause the liquid to flow in the desired direction upon the rotation of the vessel. If desired, manholes may be constructed in at least every other compartment to permit of easy inspection.

While we prefer to construct our apparatus of stainless steel, it will, of course, be appreciated that any other suitable material may be employed. Moreover, the vessel need not be cylindrical, but may be in the shape of a prism having any number of sides from three to infinity.

The operation of the apparatus of our invention will be described in connection with the washing of solid particles of material with water. In this case the solid particles to be treated are fed into the vessel 6 rotating at ⅛ to 2 R. P. M. at a rate of from 300 to 4,000 pounds per hour through conduit 7. Water is fed into the opposite end of vessel 6 through pipe 9 at the rate of from 1,000 to 40,000 pounds per hour. Upon rotation of the vessel 6 in a clockwise direction as viewed from its discharge end, the perforated portion A of displacement sheet 18, when it reaches its lowermost position lifts the wet solid particles. During about a 60 degree arc of travel, the wet solid particles drain slowly on perforated portion A and then slide down this portion into deflector 19 and are discharged therefrom into the adjacent compartment. During this draining period, the liquid in the compartment from which the solid particles had been lifted by perforated portion A of the displacement sheet 18 is being displaced by the solid portion B of said sheet. This liquid drains to the next compartment counter-current to the flow of the solid particles through the passage formed by openings 21, 22 and 23. In this manner, the solid particles are propelled through the vessel from compartment to compartment, falling in the liquor of one compartment, which liquor is subsequently drained therefrom, and the liquor is caused to pass through the compartments of the vessel counter-current to the flow of the solid particles.

The apparatus of the invention is of particular utility in the manufacture of cellulose acetate and like materials, for example cellulose nitrate, formate, propionate or butyrate. In the manufacture of cellulose acetate, the raw acetate obtained by acetylation, whether or not this has been followed by ripening, contains acetic acid which is desirable to remove both with a view to recovery of the acid and to purification of the cellulose acetate. This removal may very conveniently be effected by means of the apparatus of the invention, the raw cellulose acetate being continuously fed into, propelled through and discharged from a counter-current of a liquid capable of dissolving acetic acid but not cellulose acetate. During their passage in opposite directions through the apparatus the liquid becomes progressively richer and the cellulose acetate progressively poorer in acetic acid. As treating liquid we prefer to use water or other aqueous liquids relatively poor in acetic acid.

The application of the apparatus of the invention to a chemical treatment of flaky or granular materials by liquid media may also be illustrated by reference to the manufacture of cellulose acetate or the like substances. Certain processes result in the production of cellulose acetates containing small quantities of substances, e. g., sulphuric esters of cellulose, which it is desirable to remove with a view to stabilizing the product. This removal is effected in the so-called stabilizing step which frequently comprises treating the cellulose acetate with aqueous solutions containing acid, for example, with very dilute aqueous sulphuric acid solutions at temperatures in the neighborhood of the boiling point. This step may very conveniently be carried out by the process of the invention.

Moreover, where two or more consecutive processes both involving treatment of the solid material with liquids are involved, e. g., in cellulose acetate manufacture, where washing is followed by stabilization which is followed by a further washing, by applying the principles set out above, the various consecutive steps can be combined to give a continuous process. Cellulose acetate may for example be passed in succession through three units of the type described above arranged in series so that the material fed into the first passes through a counter-current of water or other suitable washing liquid, is fed into the second unit where it passes through a counter-current of hot, very dilute sulphuric acid and then into the third unit, where it is washed by a counter-current of water and discharged.

It is to be understood that the foregoing detailed description is given merely by way of illustration and that many variations may be made therein without departing from the spirit of our invention.

Having described our invention, what we desire to secure by Letters Patent is:

1. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel arranged for the passage of solid materials and another opening separated from said first opening and arranged for the passage of liquid in a direction opposite to the passage of said solid materials through said vessel, and means in each compartment, operable upon rotation of said vessel, constructed to lift said solid materials in its compartment at intervals to the level of the first-mentioned opening and to tip said solid materials through said opening.

2. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel arranged for the passage of solid materials and another opening separated from said first opening and arranged for the passage of liquid in a direction opposite to the passage of said solid materials through said vessel, and means, including a deflector, in each compartment, operable upon rotation of said vessel, constructed to lift said solid materials in its compartment at intervals to the level of the first-mentioned opening and to tip said solid materials through said opening.

3. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel arranged for the passage of solid materials and another opening separated from said first opening and arranged for the passage of liquid in a direction opposite to the passage of said solid materials through said vessel, and a displacement sheet in each compartment mounted on the partitions forming said compartments, said displacement sheet being constructed and arranged so as, upon rotation of said vessel, to lift said solid materials in its compartment at intervals to the level of the first-mentioned opening and to tip said solid materials through said opening.

4. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel arranged for the passage of solid materials and another opening separated from said first opening and arranged for the passage of liquid in a direction opposite to the passage of said solid materials through said vessel, a displacement sheet in each compartment mounted on the partitions forming said compartment and a deflector mounted on said displacement sheet, said displacement sheet and deflector being constructed and arranged so as, upon rotation of said vessel, to lift said solid materials in its compartment at intervals to the level of the first-mentioned opening and to tip said solid materials through said opening.

5. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel for the passage of solid materials and another opening for the passage of liquid in a direction opposite to the passage of said solid materials through said vessel, a displacement sheet in each compartment mounted on the partitions forming said compartment and tangent to the first-mentioned opening, and a deflector mounted on said displacement sheet and extending into said opening, said displacement sheet and deflector being constructed and arranged so as, upon rotation of said vessel, to lift said solid materials in its compartment at intervals to the level of the first-mentioned opening and to tip said solid materials through said opening.

6. In apparatus for treating solid materials in particle form with liquids, a vessel rotatable about a horizontal axis, partitions in said vessel dividing said vessel into a series of compartments, means for feeding the solid materials at one end of said series of compartemnts and means for feeding the liquid at the other end of said series of compartments, each partition having an opening spaced from the periphery of said vessel arranged for the passage of solid materials and another opening separated from said first opening and arranged for the passage of liquid in a direction opposite to the passage of said solid materials through said vessel, and a displacement sheet in each compartment mounted on the partitions forming said compartment, said displacement sheets being off-set from each other to form a spiral arrangement thereof, each displacement sheet being constructed and arranged so as, upon rotation of said vessel, to lift said solid materials in its compartment at intervals to the level of the first-mentioned opening and to tip said solid materials through said opening.

7. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel for the passage of solid materials and another opening for the passage of liquid in a direction opposite to the passage of said solid materials through said vessel, a displacement sheet in each compartment, said displacement sheet having a perforate portion and an imperforate portion and a deflector attached to each displacement sheet between said perforate and imperforate portions, the perforate portion being constructed and arranged so as, upon rotation of said vessel, to lift said solid materials in the compartment at intervals to the level of the first-mentioned opening and in cooperation with said deflector to tip said materials through said opening.

8. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel for the passage of solid materials and another opening for the passage of liquid in a direction opposite to the passage of said solid materials through said vessel, a displacement sheet in each compartment, said displacement sheet having a perforate portion and an imperforate portion, and a curved deflector attached to each displacement sheet between said perforate and imperforate portions and to said first-mentioned opening, the perforate portion being constructed and arranged so as, upon rotation of said vessel, to lift said solid materials in the compartment at intervals to the level of the first-mentioned opening and in cooperation with said curved deflector to tip said materials through said opening into an adjacent compartment.

9. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel for the passage of solid materials and another opening for the passage of liquid in a direction opposite to the passage of said solid materials through said vessel, a displacement sheet in each compartment, said displacement sheet having a perforate portion and an imperforate portion, and a curved deflector attached at one of its longitudinal edges to a displacement sheet between said perforate and imperforate portions and at its ends to a partition and to the periphery of said first-mentioned opening, the perforate portion being constructed and arranged so as, upon rotation of said vessel, to lift said solid materials in the compartment at intervals to the level of the first-mentioned opening and in cooperation with said curved deflector to tip said materials through said opening into an adjacent compartment.

10. In apparatus for treating solid materials in particle form with liquids, a vessel rotatable about a horizontal axis, partitions in said vessel dividing said vessel into a series of compartments, means for feeding the solid materials at one end of said series of compartments and means for feeding the liquid at the other end of said series of compartments, each partition having an opening spaced from the periphery of said vessel for the passage of solid materials and another opening for the passage of liquid in a direction opposite to the passage of said solid materials through said vessel, a displacement sheet in each compartment, said displacement sheet having a perforate portion and an imperforate portion and a deflector attached to each displacement sheet between said perforate and imperforate portions, the perforate portion being constructed and arranged so as, upon rotation of said vessel to lift said solid materials in the compartment at intervals to the level of the first-mentioned opening and in cooperation with said deflector to tip said materials through said opening into an adjacent compartment, and the imperforated portion being adapted to lift the liquid and to pass it through said second-mentioned opening into an adjacent compartment in a direction opposite to that in which the solid material was passed.

11. In apparatus for treating solid materials in particle form with liquids, a vessel rotatable about a horizontal axis, partitions dividing said vessel into a series of compartments, means for feeding the solid materials into the first of said compartments and means for feeding liquid into the last of said compartments, each partition having a central opening for the passage of solid material and a second opening for the passage of liquid, a displacement sheet in each compartment tangential to said central opening and dividing the compartment into two parts, a portion of said displacement sheet being perforated and a portion thereof being unperforated, and a curved deflector in said compartment partly surrounding said central opening and attached to and extending obliquely across said displacement sheet so as to form a barrier between the perforated part of said displacement sheet and the unperforated sheet, each of said sheets being inclined at about 20° in lead of that in the preceding compartment, the perforated portion of said displacement sheet being constructed and arranged so as, upon rotation of said vessel, to lift said solid materials in the compartment at intervals to the level of the first-mentioned opening and in cooperation with said deflector to tip said materials through said opening in the adjacent compartment, and the unperforated portion being adapted to lift the liquid and pass it through said second-mentioned opening into an adjacent compartment in a direction opposite to that in which the solid material was passed.

12. In apparatus for treating solid materials in particle form with liquids, a vessel rotatable about a horizontal axis, transverse partitions dividing said vessel into a series of compartments, means for feeding the solid materials into the first of said compartments and means for feeding liquid into the last of said compartments, each partition having a central opening for the passage of solid material and a second opening for the passage of liquid, a displacement sheet in each compartment tangential to said central opening and dividing the compartment into two parts, a portion of said displacement sheet being perforated and a portion thereof being unperforated, and a curved deflector in said compartment partly surrounding said central opening and attached to and extending obliquely across said displacement sheet so as to form a barrier between the perforated part of said displacement sheet and the unperforated sheet, each of said sheets being inclined at about 20° in lead of that in the preceding compartment, the perforated portion of said displacement sheet being constructed and arranged so as, upon rotation of said vessel, to lift said solid materials in the compartment at intervals to the level of the first-mentioned opening and in cooperation with said deflector to tip said materials through said opening in the adjacent compartment, and the unperforated portion being constructed and arranged so as to lift the liquid and pass it through said second-mentioned opening into an adjacent compartment in a direction opposite to that in which the solid material was passed.

13. An apparatus for treating solid materials in particle form with liquids, comprising a vessel rotatable about a horizontal axis, means for feeding solid materials into one end of said vessel and means for feeding liquid into the opposite end of said vessel, transverse partitions dividing said vessel into a series of compartments, each partition having a central hole therein for the passage of solid material, a displacement sheet in each compartment tangential to said central hole and dividing the compartment into two parts, a portion of said displacement sheet being perforated and a portion thereof being unperforated, and each of said displacement sheets being inclined at about 20° in lead of that in the preceding compartment, a curved deflector in each compartment partly surrounding said central hole and attached to and extending obliquely across said displacement sheet so as to form a barrier between the perforated part and the unperforated part thereof, and a passage through each of said partitions for passing liquid from one compartment to an adjacent compartment, the construction and arrangement being such that at each rotation of the vessel solid material is lifted and drained by the perforated part of each displacement sheet and deflected by the curved deflector into the next compartment, while liquid is lifted by the unperforated part of each sheet and drained through said passage through said partition into the preceding compartment.

ROBERT F. THOMPSON.
ROYAL A. STONE.